UNITED STATES PATENT OFFICE.

JOHN O. FROSHAUG, OF ALBERT LEA, MINNESOTA.

IMPROVEMENT IN COLORING AND PRESERVING WOOD TO IMITATE SLATE.

Specification forming part of Letters Patent No. 145,859, dated December 23, 1873; application filed October 27, 1873.

*To all whom it may concern:*

Be it known that I, JOHN O. FROSHAUG, of Albert Lea, in the county of Freeborn and State of Minnesota, have invented a certain Improvement in Coloring and Preserving Wood, of which the following is a specification:

This invention relates to a process of treating shingles with a chemical solution, whereby their color is changed to a steel-gray, resembling slate, and substances are deposited in their pores and upon their surfaces which also render them practically both fire-proof and water-proof, and preserve them against decay. The process may, of course, be practiced on other wooden articles and things it is desirable to thus color and preserve. It consists in subjecting wood in a closed vessel to a boiling solution prepared by dissolving certain hereinafter-specified chemicals in boiling water.

In practicing my invention, take of sulphate of iron, ten pounds; chloride of sodium, three pounds; alum, two pounds; extract of logwood, one pound, and, after pulverizing the first three articles mentioned, mix all the ingredients with thirty gallons of water, poured in a suitable kettle or digester. The kettle is placed over a rather brisk fire, and the mixture boiled for about half an hour, by which time all the ingredients will have become dissolved. The cover of the kettle is then removed, and a quantity of shingles placed in the solution, care being taken that they are wholly immersed. After that the shingles should be boiled for about two hours in the solution, the quantity of the latter lost by evaporation being carefully made up by adding some from time to time, so that the shingles may always remain wholly immersed while undergoing this treatment. The shingles are subsequently removed, and, after cooling and drying, are ready for use.

In lieu of the extract of logwood, chipped or rasped logwood may be employed, and a decoction prepared from it in conjunction with the other ingredients mentioned, in the manner above stated; but in this case the proportion of logwood used will be from twelve to sixteen pounds.

Shingles thus prepared undergo an entire change of color after they have been for some time exposed to the rays of the sun, and become of a steel-gray color, so that a roof covered with them will resemble a slate-roof in appearance. They are nearly water-proof, and fire-proof to such a degree that they will not ignite unless exposed to a very intense heat.

A roof already covered with shingles may be treated with a solution made as above, except that double quantities of the ingredients are used. It should be applied with a brush like paint, and will effect very beneficial results.

What I claim as my invention, and desire to secure by Letters Patent, is—

The herein-described process of treating shingles, and other things made of wood, to impart to them a slate color and to preserve them, by boiling them in a solution prepared by dissolving in water sulphate of iron, alum, chloride of sodium, and extract of logwood, in substantially the proportions specified.

In testimony whereof I have signed my name to this specification in the presence of two subscribing witnesses.

J. O. FROSHAUG, M. D.

Witnesses:
  JOHN NULSON,
  A. E. JOHNSON.